United States Patent [19]
Turner

[11] 4,316,676
[45] Feb. 23, 1982

[54] MECHANICAL JOINT

[75] Inventor: Charles E. Turner, Richardson, Tex.

[73] Assignee: Hi-Mark Industries, Inc., Richardson, Tex.

[21] Appl. No.: 165,102

[22] Filed: Jul. 1, 1980

[51] Int. Cl.³ .............................................. F16B 7/04
[52] U.S. Cl. ..................................... 403/260; 403/405
[58] Field of Search ............... 403/262, 230, 387, 260, 403/264, 405; 248/188, 507, 503

[56] References Cited

U.S. PATENT DOCUMENTS

| | | | |
|---|---|---|---|
| 1,157,827 | 10/1915 | Wardwell | 403/387 X |
| 2,040,374 | 5/1936 | Grimes | 403/260 X |
| 2,368,382 | 1/1945 | See | 403/230 X |

FOREIGN PATENT DOCUMENTS

| | | | |
|---|---|---|---|
| 1907697 | 8/1970 | Fed. Rep. of Germany | 248/188 |
| 91137 | 3/1968 | France | 248/188 |
| 1428558 | 3/1976 | United Kingdom | 403/230 |

Primary Examiner—Andrew V. Kundrat
Attorney, Agent, or Firm—Richards, Harris & Medlock

[57] ABSTRACT

A device for attaching a plate (12) to a post (14) with a plurality of rectangular apertures (18) equally spaced about the post (14). A plurality of arms (16) are engaged in the post (14), each arm including a retaining end (30) joined to a flat portion (22) by a waist (28). The end (30) is dimensioned to pass through the longer dimension (32) of the rectangular aperture (18) but not through the shorter dimension (34) of the aperture (18). The waist is dimensioned to fit within the shorter dimension (34) of the aperture (18). The flat portion (22) of the arm (16) has a hole (24) threaded to receive a bolt (20). A leg portion (26) extends from the flat portion for contacting the plate (12). Tightening the bolts (20) clamps the plate (12) into abuttment with the post (14) and the legs (26) of the arms (16).

4 Claims, 5 Drawing Figures

MECHANICAL JOINT

FIELD OF THE INVENTION

This invention relates to mechanical joints, and more particularly, to mechanical joints between a relatively flat surface and the end of a post.

DESCRIPTION OF THE PRIOR ART

In the assembly and use of items of manufacture, a need exists for a device which can economically attach the end of a post to a flat surface. For example, in attaching a barbecue oven to a supporting post or legs to a table top, the need exists for some device to connect the post or leg in a secure manner to that which they are to support.

Prior methods of attaching a plate or other flat surface to a post have generally involved welding. This method may not be entirely satisfactory in some cases because the weld is permanent and the item cannot be disassembled for repair or transportation. Also, welding requires expensive equipment and operators who are skilled in using this equipment.

Alternatively, a collar having a flange may be welded to the top of the post to permit the flange to be bolted to the bottom of the article to be supported. Here again, welding is usually employed to attach the collar and flange to the post.

SUMMARY OF THE INVENTION

The invention generally comprises a mechanical joint which employs a hollow post having a plurality of apertures spaced at intervals around the circumference of the post at one end of the post. The apertures are preferably rectangular in shape with the long side of the aperture being along the length of the post. The joint also employs a plate, preferably with a flat surface, which can be brought into abutment with the end of the post provided with the apertures. To secure the post and plate together, there are provided at least two arms, preferably L-shaped with a width less than the length of the apertures and with a narrow waist near one end which is slightly smaller than the width of the apertures. The ends of the arms having the waist may then be passed through the apertures and turned when the waist portion is within the aperture to prevent withdrawal of the arms in the turned position. Fastening means, such as bolts, which pass through the arms and the plate, are used to draw the arms into engagement with the bottom of the plate and the plate oriented ends of the apertures to draw the top of the post into abutment with the plate.

BRIEF DESCRIPTION OF DRAWINGS

A more complete understanding of the invention and its advantages will be apparent from the following Detailed Description taken in conjunction with the accompanying Drawings, in which.

DESCRIPTION OF THE PREFERRED EMBODIMENT

Figure 1:
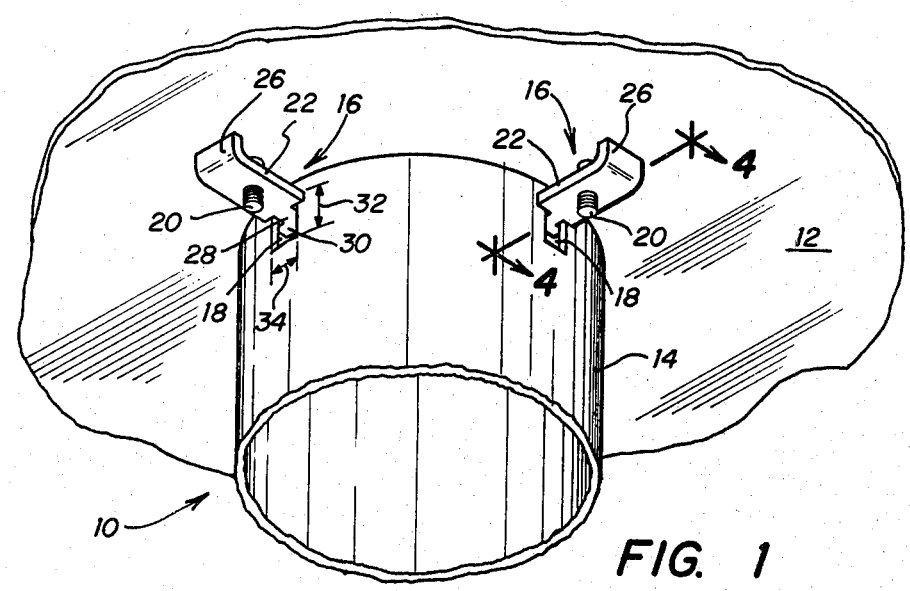
FIG. 1 is a perspective view of one embodiment of the present invention.

One embodiment of the present invention is generally indicated by the reference numeral 10. Only portions of plate 12 and post 14 which are attached to each other are shown to simplify the illustration. Post 14 is cylindrical, but can assume any suitable configuration, such as square or rectangular in cross-section. In the preferred embodiment, plate 12 is a flat surface; however, as plate 12 represents the bottom surface of an item, it could be of an appropriate obloid or spherical shape.

The post 14 has L-shaped arms 16 slidably secured in rectangular apertures 18. Bolts 20 are inserted through plate 12 and flat portion 22 of the arm 16. An aperture 24 in the arm 16 can be threaded to accommodate the threads of the bolt 20.

The arms 16 also have a leg 26. Arms 16 have a reduced width waist 28 and an end 30 wider than waist 28. The width of end 30 is less than the length 32 of the rectangular aperture 18.

Figure 2:
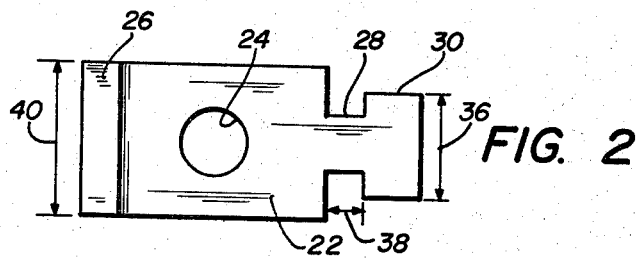
FIG. 2 is a plan view one of the arms depicted in FIG. 1.

FIG. 2 illustrates the dimensions of end 30 and waist 28 of the arm 16. The end 30 has a width 36 which is designed to fit within the rectangular aperture 18 in the post 14. Specifically, when each arm 16 is turned 90° from the position illustrated in FIG. 1, width 36 of arm 16 will pass through the rectangular aperture 18. The width 36 of the end 30 is therefore slightly smaller than the length 32 of the rectangular aperture 18. However, the length of the end 30 is greater than the width 34 of the rectangular aperture 18. Each arm 16 cannot pass through rectangular aperture 18 when the arm 16 is turned to the position shown in FIG. 1.

Each arm 16 also has a waist 28. The waist 28 is smaller than the width 34 of the rectangular aperture 18, so that arm 16 can move vertically in the rectangular aperture 18. The length 38 of the waist 28 must be at least equal to the thickness of the post 14. In the preferred embodiment, the length 38 of the waist 28 is slightly greater than the thickness of the post 14, so that arm 16 fits loosely within the rectangular aperture 18.

As discussed hereinbefore, aperture 24 is threaded to accept bolt 20. As will be evident to those of skill in the art, bolt 20 could be inserted through aperture 24 and a nut threaded thereon, in which case aperture 24 would not have to be threaded. Any type of fastening device, such as a rivet or screw, could be used in lieu of bolt 20.

Flat portion 22 of arm 16 has a width 40 which is greater than the length 32 of aperture 18. Thus, when arm 16 is inserted in aperture 18, flat portion 22 contacts post 14 and will not pass through aperture 18.

Figure 3:
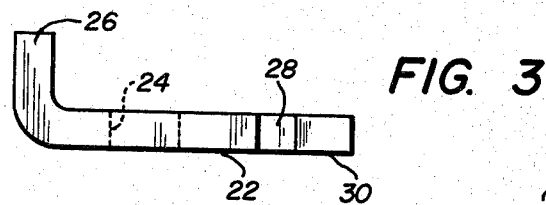
FIG. 3 is a side view of the arm.

FIG. 3 is a side view of an arm 16 of the present invention 10. Leg 26 extends from the flat portion 22 of the arm 16. Leg 26 extends above flat portion 22 by an amount approximately equal to the distance from the topmost edge of the rectangular aperture 18 to the plate 12. Leg 26 could be omitted in certain applications, as when plate 12 is not flat, but is provided with protrusions which extend downwardly to a point where flat portion 22 could engage the protrusion.

Figure 4:
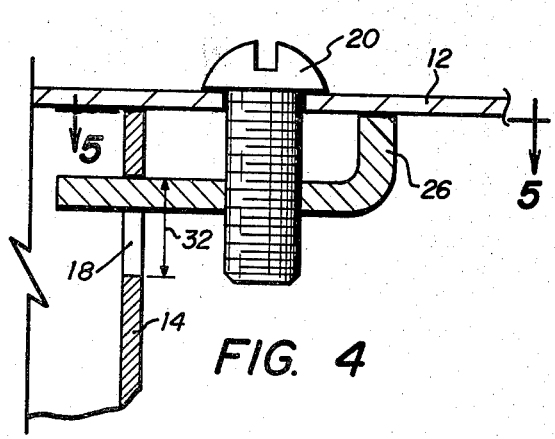
FIG. 4 is a view taken along the lines 4—4 of FIG. 1.

FIG. 4 illustrates an arm 16 of the present invention as it is used to attach the post 14 to the plate 12. Apertures 18 are formed in post 14 by any suitable machining process. Each aperture 18 is dimensioned in accordance with the shape of arm 16, as explained herein, and one aperture 18 is required for each arm 16. A hole is formed in plate 12 and bolt 20 is inserted therethrough and threaded into the aperture 24. Leg 26 of arm 16 contacts the plate 12, as does the top surface of post 14. Tightening the bolt 20 clamps the arm 16 and the post 14 against the plate 12. As seen most clearly in FIG. 4, leg 26 is of approximately the same length as the distance from the top of the rectangular aperture 18 to the plate 12 on the post 14. As will be evident to those of skill in the art, plate 12 could be threaded to accept bolt 20, in which case bolt 20 would be inserted through the aperture 24 and threaded into plate 12.

Figure 5:
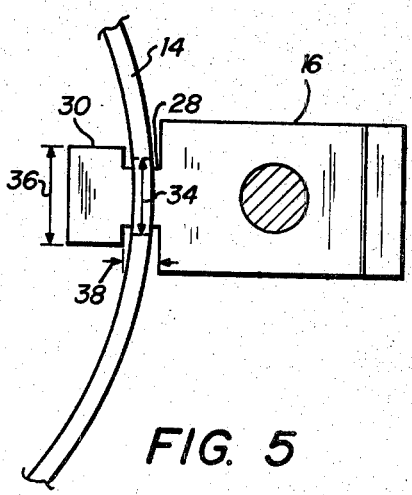
FIG. 5 is a view taken along the lines 5—5 of FIG. 4.

FIG. 5 illustrates arm 16 as it is positioned in the post 14. As seen most clearly in FIG. 5, the length 38 of waist 28 it greater than the thickness of the post 14. The width 36 of end 30 is greater than the width 34 of rectangular aperture 18, so end 30 cannot pass through the rectangular aperture 18 when positioned as illustrated.

In the preferred embodiment, three arms 16 are used to attach the plate 12 to the post. Arms 16 are equally spaced about the circumference of the post 14. More than three arms 16 can, of course, be used, the additional arms adding strength and stability to the mounting, and two will suffice in some applications.

While only one embodiment of the present invention has been described in detail herein and shown in the accompanying Drawings, it will be evident, after reading the foregoing disclosure, that various other embodiments can be made without departing from the spirit and scope of the invention.

I claim:

1. A mechanical joint comprising:
   a hollow post having a plurality of apertures spaced at intervals around the circumference of the post adjacent one end of the post, each of said apertures having a dimension across the aperture which is greater than the width of that part of the aperture nearest the closest end of the post;
   a plate having a surface which can be brought into abuttment with the end of the post having the apertures therein;
   a plurality of arms, each arm having one end which is adapted to be positioned radially through the apertures in the post and extend radially therefrom, that end of the arm having a width which is greater than the width of that part of the aperture nearest the closest end of the post and a reduced width waist portion intermediate the ends of the arm which is smaller than the width of that part of the aperture nearest the closest end of the post to permit that end of the arm to be inserted into the aperture and when the waist portion is positioned in the aperture nearest the closest end of the post to prohibit withdrawal of the arm from the aperture, the opposite end of the arm also extending radially from the post; and
   fastening means engaging the radially extending opposite end of the arms and the plate to join the post and the plate in an abutting relationship.

2. The apparatus of claim 1, wherein:
   the apertures in said post are longer than they are wide, relative to the longitudinal axis of the post, to permit an end of the arms to be passed through the aperture and turned through an arc to prevent withdrawal of the arm from the aperture in the turned position.

3. The apparatus of claim 1, wherein:
   the ends of the arms to be positioned within the apertures are provided with oppositely oriented U-shaped recesses which form the waist of the arms, the width of each waist being less than the width of that part of the apertures nearest the closest end of the post and the width of the arm on either side of the waist being greater than that part of the apertures nearest the closest end of the post.

4. The apparatus of claim 3 wherein the radially extending ends of the arms are L-shaped so that the legs of the L-shaped arms will engage a surface of the plate when the fastening means are utilized.

* * * * *